(12) United States Patent
Nesmeev

(10) Patent No.: US 12,722,775 B2
(45) Date of Patent: Sep. 1, 2026

(54) AIRCRAFT SIDESTICK

(71) Applicant: Evgeny A. Nesmeev, Ulan-Ude (RU)

(72) Inventor: Evgeny A. Nesmeev, Ulan-Ude (RU)

( * ) Notice: Subject to any disclaimer, the term of this patent is extended or adjusted under 35 U.S.C. 154(b) by 239 days.

(21) Appl. No.: 18/702,879

(22) PCT Filed: Jul. 27, 2022

(86) PCT No.: PCT/RU2022/000241
§ 371 (c)(1),
(2) Date: Apr. 19, 2024

(87) PCT Pub. No.: WO2023/075639
PCT Pub. Date: May 4, 2023

(65) Prior Publication Data

US 2024/0417064 A1 Dec. 19, 2024

(30) Foreign Application Priority Data

Oct. 27, 2021 (RU) ................................ 2021127270

(51) Int. Cl.
*B64C 13/04* (2006.01)

(52) U.S. Cl.
CPC ................................ *B64C 13/0421* (2018.01)

(58) Field of Classification Search
CPC .... B64C 13/0421; B64C 13/06; G05G 9/047; G05G 9/053
USPC .................................................. 318/628, 560
See application file for complete search history.

(56) References Cited

U.S. PATENT DOCUMENTS 7,033,374 B2 * 4/2006 Schaefer .......... A61B 17/12022 606/200
8,707,528 B2 * 4/2014 Ozdyk .................... B23F 5/205 409/27
8,887,363 B2 * 11/2014 Boyes ..................... B23B 3/165 82/900
10,293,919 B2 * 5/2019 Gomolko ............... G05G 9/047
12,038,775 B2 * 7/2024 Nesmeev ................ G05G 5/03

* cited by examiner

*Primary Examiner* — David Luo
(74) *Attorney, Agent, or Firm* — Lawrence G. Fridman, ESQ; FEIGIN & FRIDMAN. LLC

(57) ABSTRACT

An aviation sidestick is a device that can be used to control various manned and unmanned equipment, including flying, ground, underwater, to control spacecraft in outer space and to control computer games. It consists of a housing, a handle with buttons and a scroll wheel, a bracket/arm, a compensating mechanism, a fixed base in the form of a spherical segment and a mechanism that simulates feedback located under the compensating mechanism, while the geometric centers of the sphere and the focus of the sphere segment do not coincide, but is positioned on the same axis.

16 Claims, 7 Drawing Sheets

AIRCRAFT SIDESTICK

FIELD OF THE INVENTION AND DESCRIPTION OF THE PRIOR ART

An aviation sidestick (hereinafter referred to as the device) is a device consisting of a body, a handle with programmable buttons and a scroll wheel; a fixed base and a mechanism are located under the fixed base. The device can be used to control various manned and unmanned equipment, including flying, ground, underwater, and to control spacecrafts in outer space. In addition, the device can be used to control computer games.

The device of the invention performs similar functions to the known joystick design, for example, as described in the patent U.S. Pat. No. 4,870,389A, as well as to the known sidestick designs described in the following patents: U.S. Pat. No. 5,149,023A, GB2484830A, U.S. Pat. Nos. 9,051,836B2, 9,056,675B2, 9,067,672B2, 9,405,312B2.

All these devices share several disadvantages/drawbacks that make it difficult to control the operation of such devices. Among such drawbacks are a large distance between the handle and the axis of rotation, as in the U.S. Pat. No. 5,149,023A patent; or an insufficient number of degrees of freedom, as in the U.S. Pat. No. 9,051,836B2 patent.

The closest prior art known to the inventor is Russian patent RU2730081. However, this design has a problem with the curvature of the supporting hemispherical base. This may result in difficulty scaling the design. That is, the smaller the hemispherical base is, the greater its curvature, which can make it difficult to use. On the other hand, the larger is the hemispherical base, the larger the bracket connecting the handle and the sphere should be. This may also make the device difficult to use.

DESCRIPTION OF THE INVENTION ILLUSTRATED IN THE DRAWINGS

The design of the aviation sidestick of the invention is free of the above-noted shortcomings. The design of the invention is represented by the following figures:

FIG. 1 is a schematic cross-sectional view of the device of the invention, wherein:

1—handle with programmable keys and a scroll wheel (the keys and scroll wheel are not indicated in the figures, hereinafter-handle), 2—main bracket; 3—printed circuit board with electronic components (hereinafter-board); and 15—optical sensor; 4—sphere; 5—stepper motor; 6—threaded bushing; 7—solenoids with ball bearings (hereinafter-solenoids); 8—external cylinder; 9—internal cylinder; 10—bottom bracket, 11—device housing (hereinafter-housing), 12—sphere segment, 13—bracket mobility sector; 14—gap; 15—optical sensor; 16—screw; 21—solenoid core; 22—window for the solenoid; 31 partition; 33—main bracket window (hereinafter—window); 34—focus sphere segment; 35—common imaginary axis of the sphere and sphere segment (hereinafter-axis); 36—middle bracket and 37—bar.

Explanation: the center of the sphere is not indicated in the figures and it must be understood that it correspond to the geometric center of the sphere 4. The focus of the sphere segment 34 is the center of an imaginary sphere, a part of which is used to form the “sphere segment” figure.

FIG. 4 illustrates 5—stepper motor, 28—spur gear, 23—gear bar, 9—inner cylinder, 8—outer cylinder. Explanation: use of both straight and helical gears is in the scope of the invention.

FIG. 5 illustrates the following elements of the invention: 8—outer cylinder, 9—inner cylinder, 24—worm shaft, 25—guide groove, 30—threaded ring, 32—guide protrusion.

FIG. 6 illustrates the following elements of the invention: 5—stepper motor, 6—threaded bushing, 26—large gear, 9—inner cylinder, 8—outer cylinder, 29—small gear, 27—gear screw.

Figure 7:
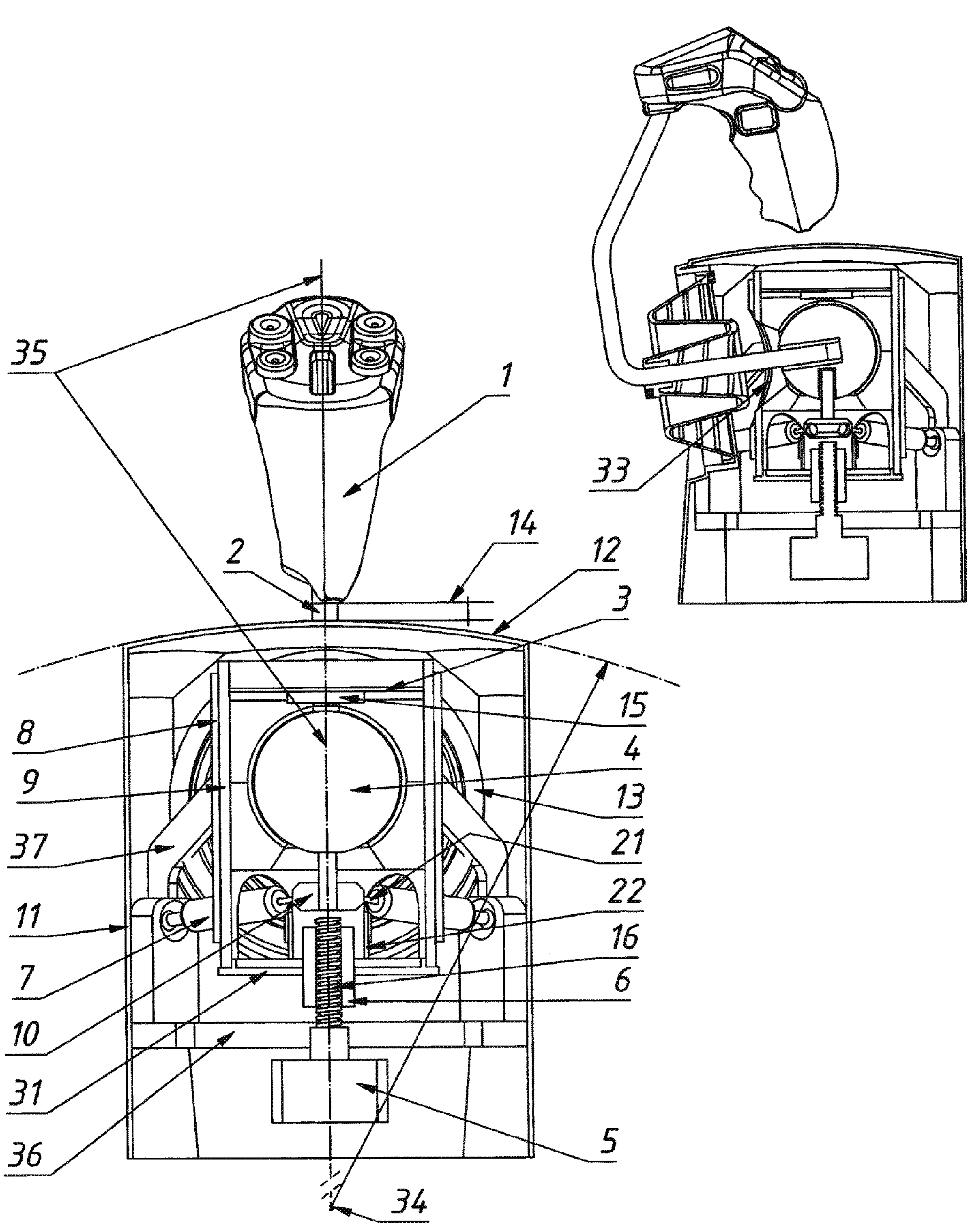

Referring now to FIG. 7 which represents a sectional view of the device, wherein the following elements of the invention are illustrated:

1 is a handle with programmable keys and a scroll wheel (the keys and scroll wheel are not indicated in the figures, hereinafter—the handle), 2 is the main bracket, 3 is a printed circuit board with electronic components (hereinafter—the board); 15 is an optical sensor, 4—a sphere, 5—a stepper motor, 6—a threaded bushing, 7—a solenoids with ball bearings (hereinafter: solenoids), 8—an outer cylinder, 9—an inner cylinder, 10—a bottom bracket, 11—a device body (hereinafter: housing), 12—a sphere segment, 13—a bracket mobility sector, 14—a gap, 15—an optical sensor, 16—a screw, 21—a solenoid core, 22—a window for the solenoid, 31—a partition, 33—a main bracket window (hereinafter: window), 34—a focus of the sphere segment, 35—a common imaginary axis of the sphere and sphere segment (hereinafter: axis), 36—a middle bracket, 37—a bar.

Figure 1:
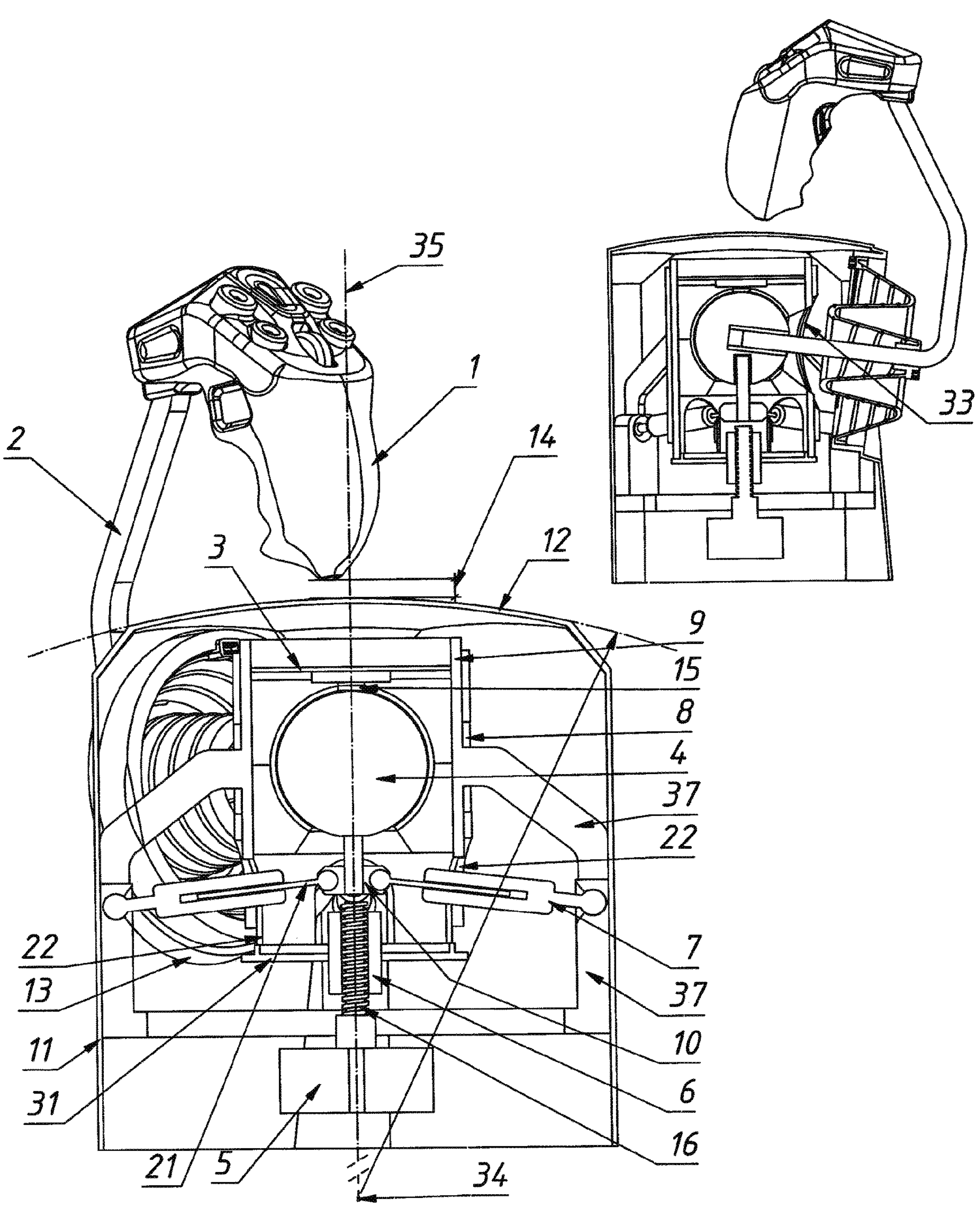
Figure 2:
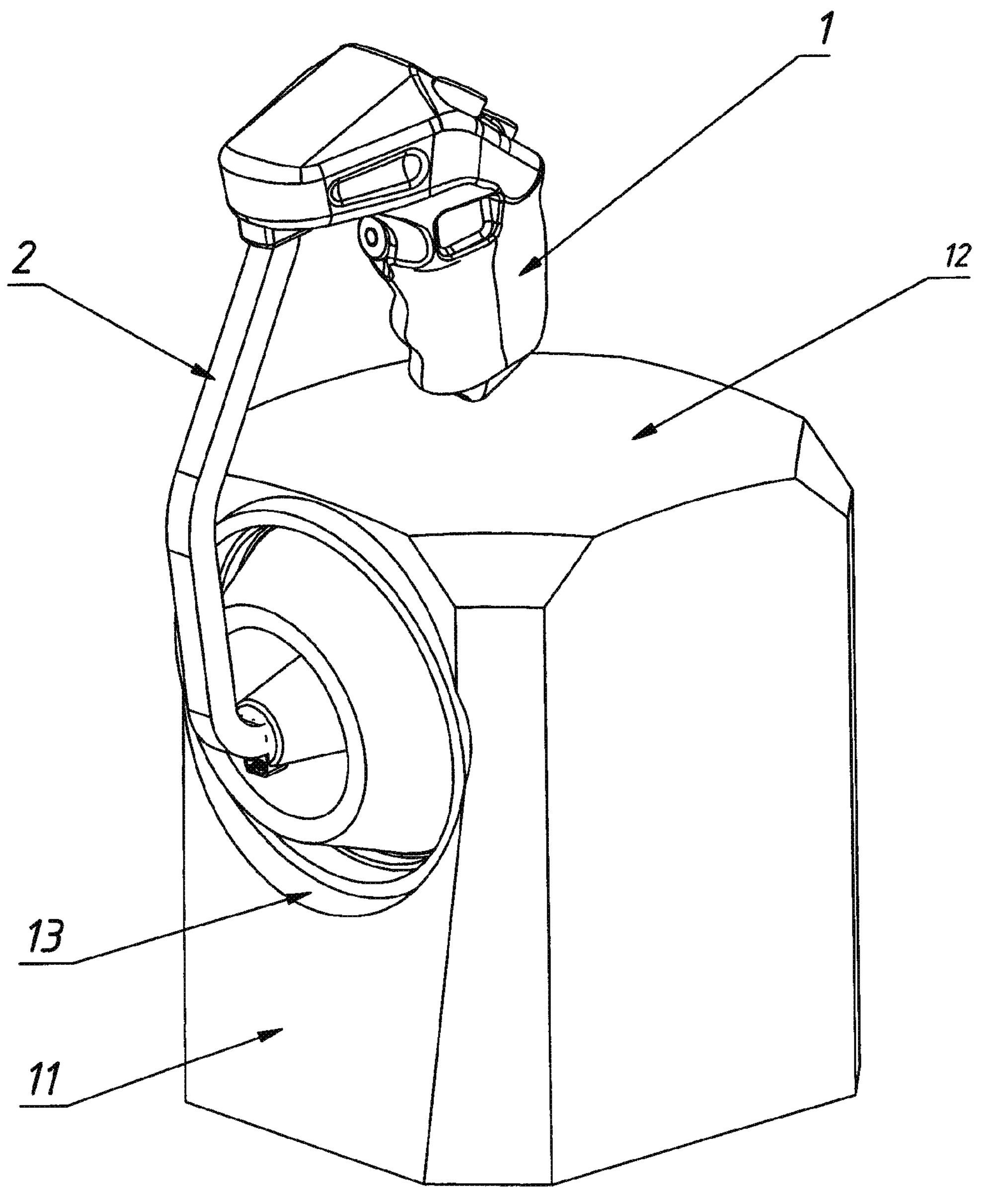
FIG. 2 illustrates an exterior view of the device, wherein: 1—handle, 2—main bracket, 11—body, 12—sphere segment, 13—bracket mobility sector.

Referring now to FIG. 1 and FIG. 7 illustrating the device which consists of a housing 11, a handle 1, a main bracket 2 which can be formed having two parts, upper and lower (not indicated in the figures); a compensating mechanism is located inside the housing 11 provided to automatically adjusts the gap 14, the compensating mechanism consists of a stepper motor 5, a screw 16 and a threaded bushing 6, which serve to adjust the gap 14 by moving up or down the inner cylinder 9; as well as the board 3 located inside the cylinder 9 with an optical sensor 15 installed on the board; a sphere 4 on which the lower end of the main bracket 2 is fixed and the lower bracket 10 is also fixed, in which the solenoid cores 21 are secured using a ball joint.

The design also contains a screw 16, a threaded bushing 6, solenoids 7 secured by a ball joint on the middle bracket 36. Also, illustrated in FIG. 1 there is a gap 14 between the sphere segment 12 and the handle 1; the size of the gap can vary within the range from 4 to 15 mm, depending on the size of the user’s hand.

There are also shown the following structural elements—the mobility sector of the bracket 13 in the form of a cutout in the sphere segment 12 and in the housing 1; the outer cylinder 8 is rigidly connected to the housing 1; a movable inner cylinder 9 is installed in the housing 1; the cylinder 9 is rigidly attached to the middle bracket 36 using strips 37.

Figure 3:
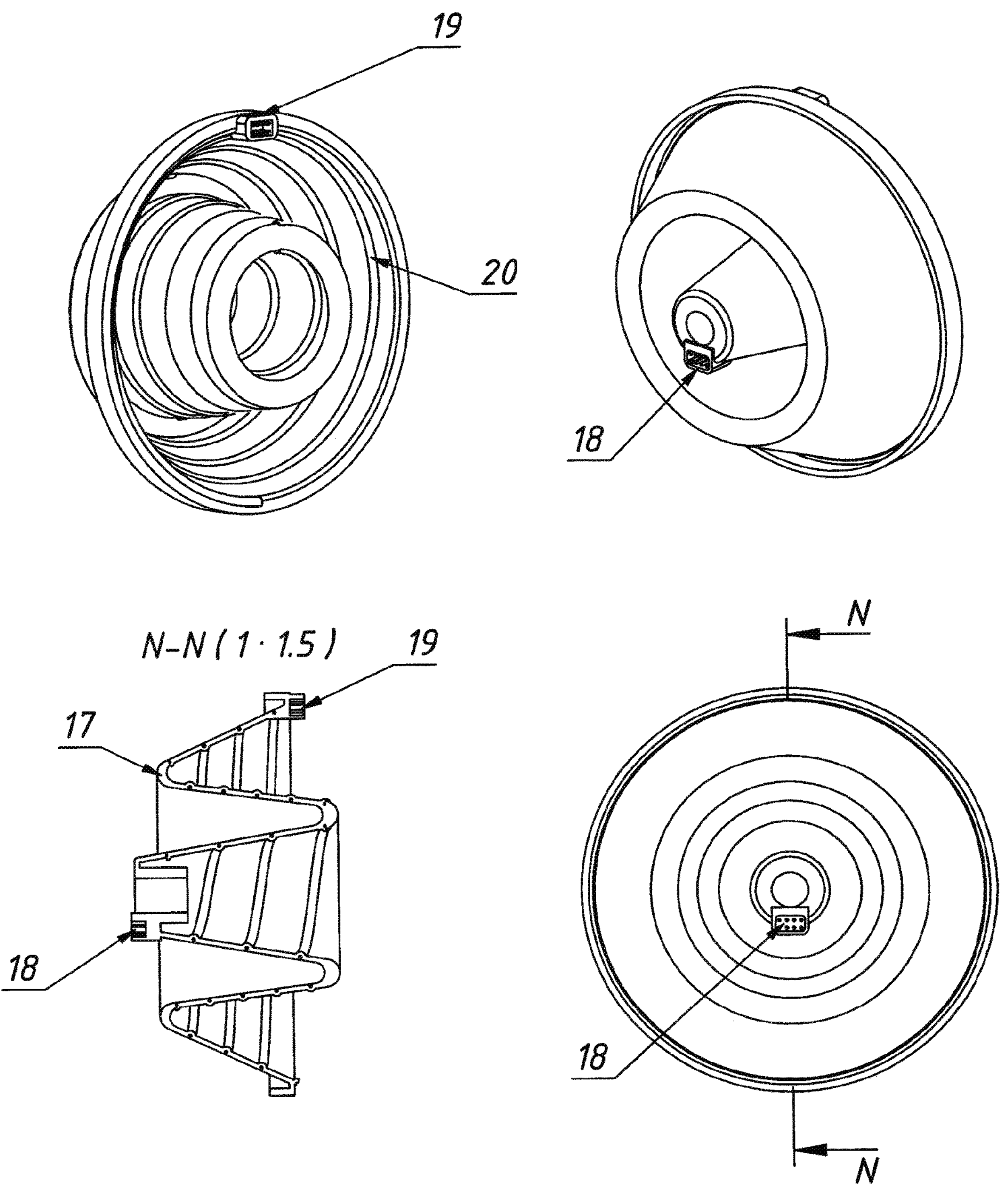
FIG. 3 depicts the following elements of the invention: 17—corrugated structure, 18—first electrical connector, 19—second electrical connector, 20—electrical wires (hereinafter-wires).

In addition, when connecting using wires laid from the buttons (not indicated in the figures) handle 1 to the board 3 a corrugated structure 17 (FIG. 3) can be used; the sockets of which/corrugated structure 17 have built-in electrical connectors: the first electrical connector 18 and the second electrical connector 19, which are connected to each other by wires 20 laid in the body of the material used for manufacturing of the corrugated structure.

Each socket may include several electrical connectors, or the circumference of each socket may be in the form of a continuous connector. That is, the end of the wires coming out of the handle 1 may be provided with a connector (not shown). Such connector is connected to the first electrical connector 18 located on the bell of the corrugated structure 17, and the second electrical connector 19 is connected to the connector installed on the housing 11 (not shown). This assures a reliable contact between different parts of the electrical circuit through a flexible corrugated structure.

Figure 4:
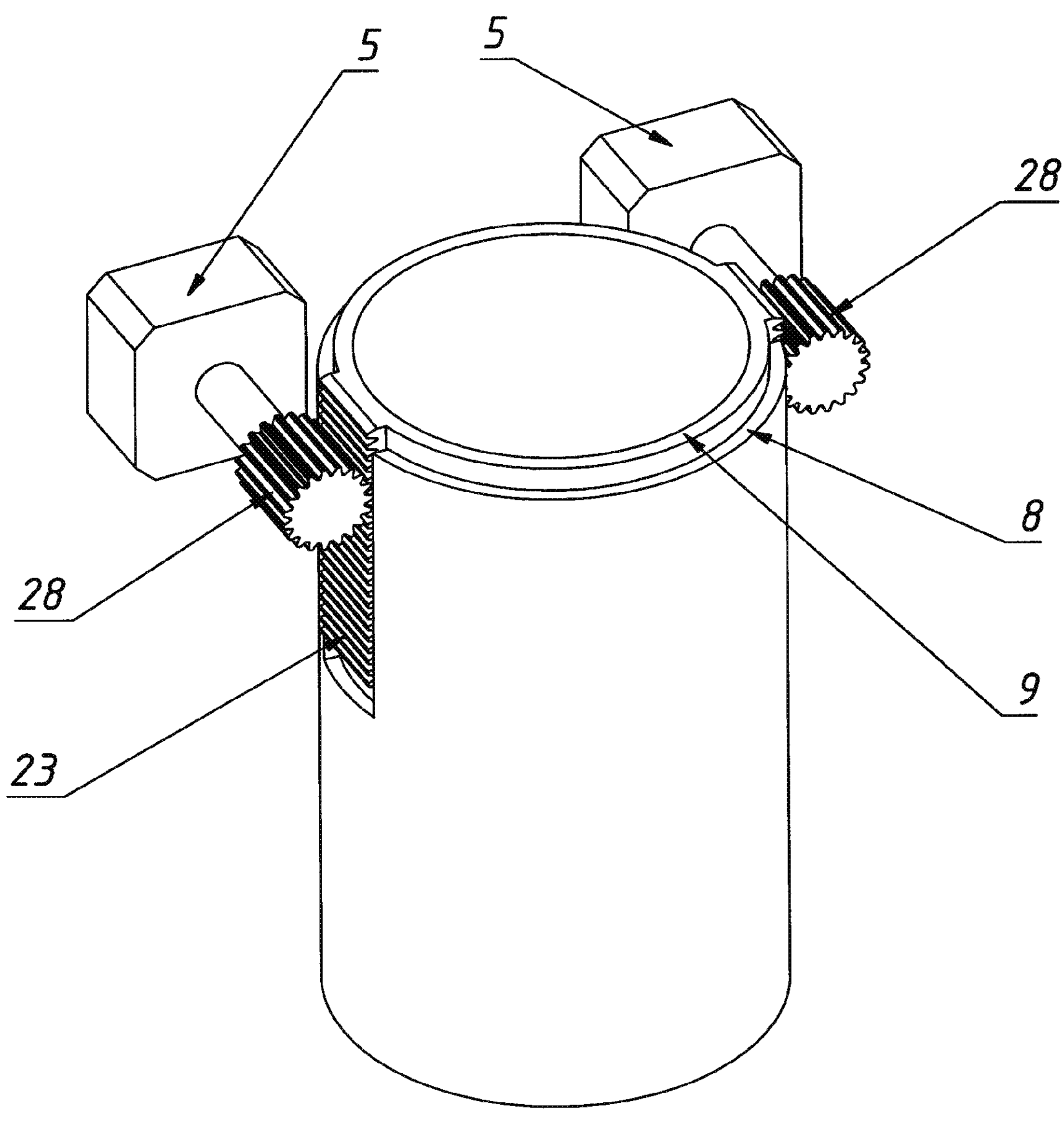
FIGS. 4, 5 and 6 show embodiments of a compensating mechanism for adjusting the gap 14.
Figure 5:
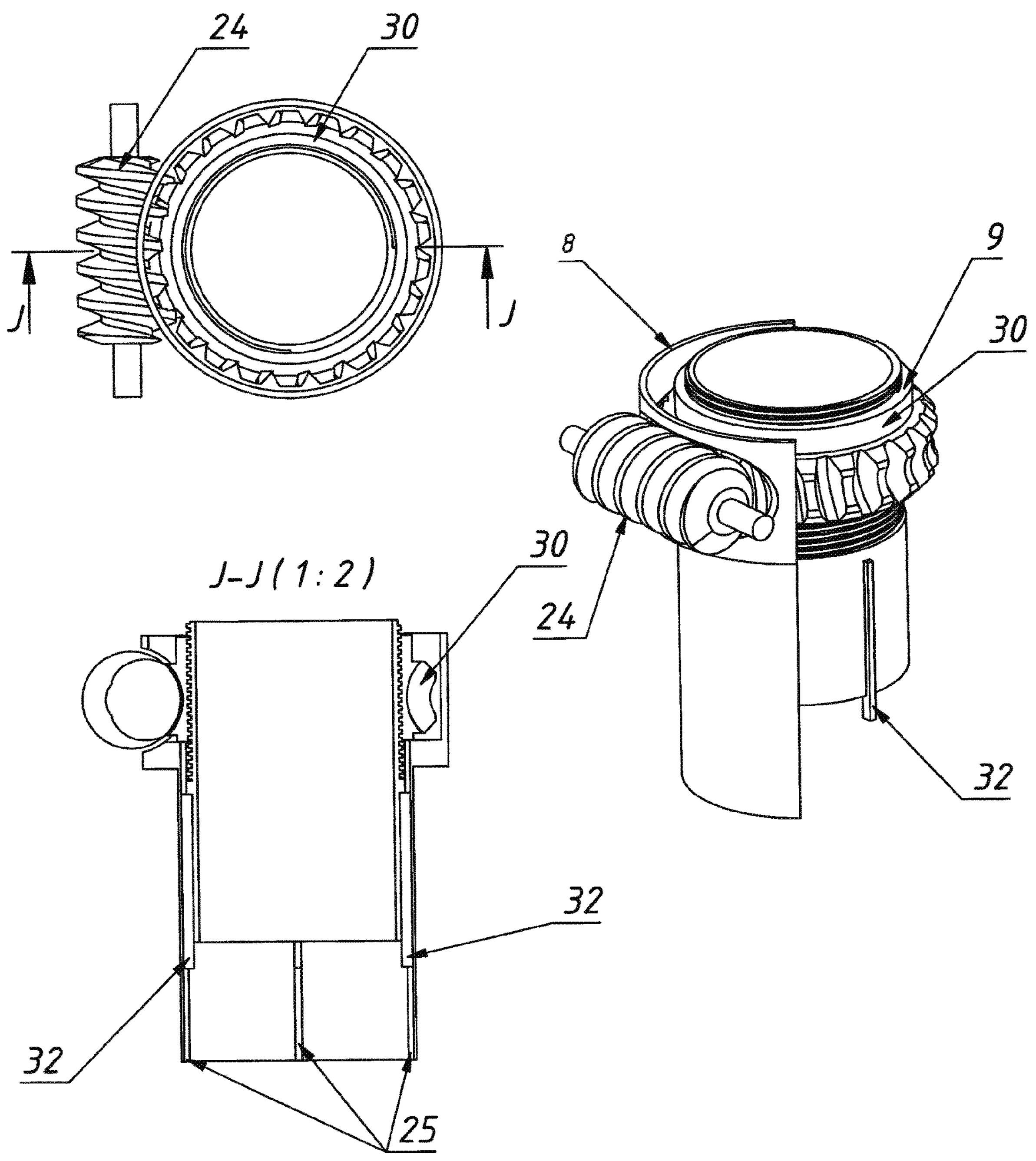
Figure 6:
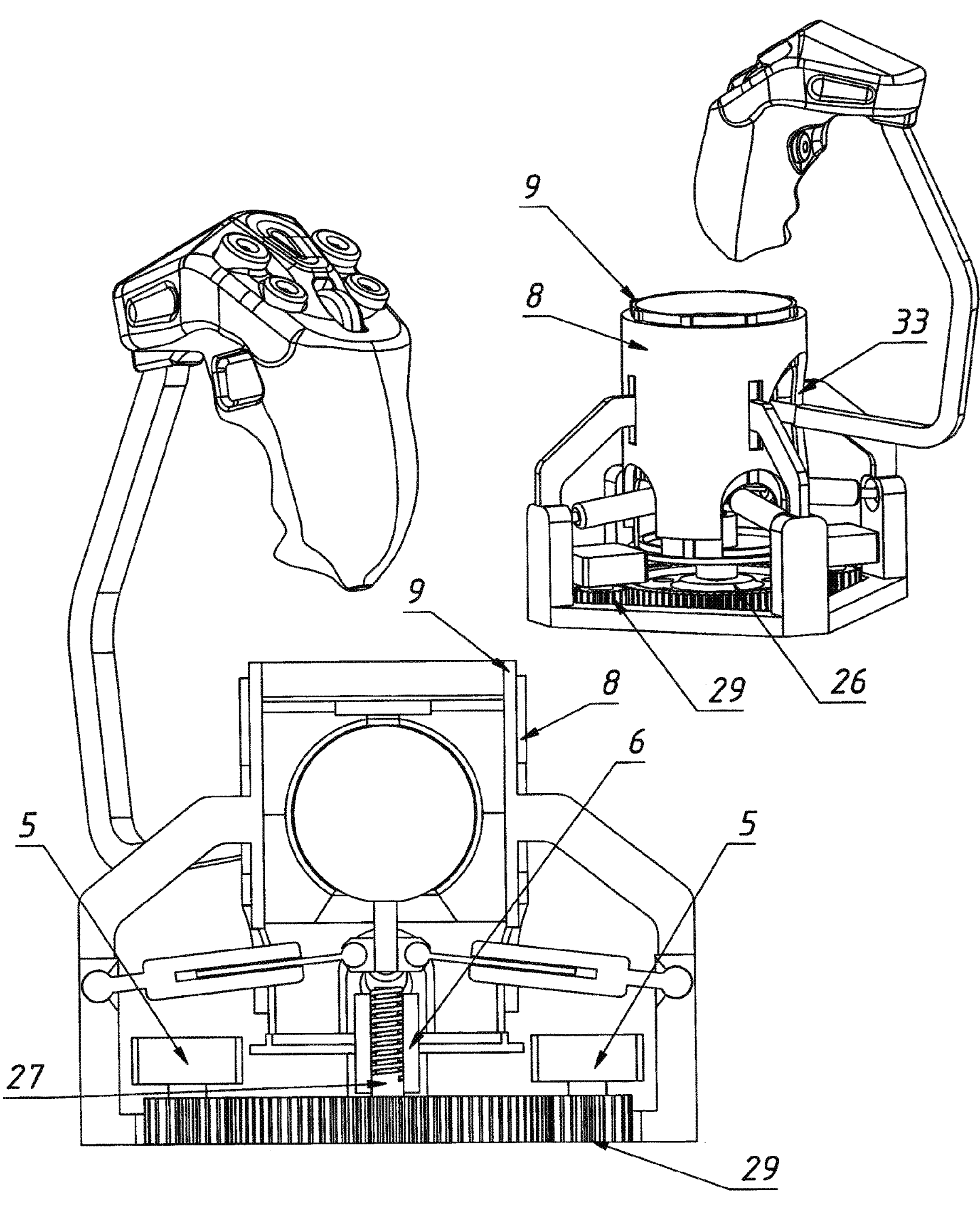

Referring now to FIGS. 4, 5 and 6 illustrating examples of the mechanism for moving the inner cylinder 9 used for adjusting the gap 14. FIG. 4 shows an embodiment of a mechanism with gear racks 23 installed on the sides of the inner cylinder 9, in the cutouts of the outer cylinder 8 (not indicated), wherein the gear racks 23 engage the spur gears 28 driven into rotation by the stepper motor 5. In this way, the inner cylinder 9 moves up or down.

FIG. 5 shows a mechanism for moving the inner cylinder 9 using a worm shaft 24, which rotates a threaded ring 30 embedded between the outer cylinder 8 and the inner cylinder 9, having threaded engagement with it. In this case, the inner cylinder 9 does not rotate due to the guide grooves 25 and guide protrusions 32.

FIG. 6 shows a mechanism for moving the inner cylinder 9 relative to the outer cylinder 8 using a large gear 26, a small gear 29, a stepper motor 5, a screw 16 and a bushing 6. In this version of the mechanism, both spur and helical gears can be used.

The aviation sidestick can be made for both the left and right hand of the user. This description presents a version of the device for the right hand.

In contrast with the design presented in the Russian patent RU2730081, the present design of the aircraft sidestick has significant differences and is free of its drawbacks, namely:

in the present design of the aircraft sidestick, the adjustment of the gap between the handle and the segment of the sphere 12 can be done either by using the main bracket 2 equipped, for such possibility with its own screw and a stepper motor, or equipped with a compensating mechanism installed in the body of the device. However, Figures of the present application show the design of an aircraft sidestick, wherein the regulation of the gap 14 is carried out only by a compensating mechanism.

Another essential feature which differentiates the invention over the prior art is the possibility of using a sphere segment 12 of a larger radius, without necessarily combining its focus of the sphere segment 34 and the center of the sphere 4 installed in cylinder 9. This is a major distinction over patent RU2730081, where the centers of the sphere and the hemispherical base must coincide. In the present invention the vertical coaxiality of the center of sphere 4 and the focus of the sphere segment 34 are maintained. Explanation: the hemispherical base is a term used in patent RU2730081.

The use of a sphere segment 12 having a large radius makes it possible to make its surface (intended to support the hand of the user holding the handle 1) more even. This significantly increases the ability of the invention to accurately control various equipment used with the device of the invention.

The aviation sidestick of the invention operates in the following manner: the user connects the device to a source of electrical power; wherein the computing device, guided by the respective program sends electronic signals to the stepper motor of the compensating mechanism and to the solenoids of the feedback mechanism. These elements of the invention set the handle 1 to the desired height above the segment of the sphere 12 to the position at the origin of coordinates, which may be located in the center of the sphere segment 12 or at another place, depending on the settings. Then, the user by holding the handle 1 with the edge of a bent palm, touches the segment of the sphere 12 (which is made of a slippery material). Sliding motion of the edge of the user's palm, when moving the handle 1, is carried out due to the gap 14. This gap should remain unchanged at any part of the segment of the sphere 12. In this case, in view to the window 33, the main bracket 2 connects the handle 1 and the sphere 4 located in the inner cylinder 9.

Moreover, the center of the sphere 4 and the focus of the sphere segment 34, as well as their radii do not coincide and are located at the same axis 35. However, the user, whose palm edge touches the sphere segment 12 when moving the handle, does not feel any discomfort. This is due to the decrease or increase of the gap 14. Such a result is achieved in view of a compensating mechanism located inside housing 11.

The compensation mechanism operates in the following manner. The outer cylinder 8 is rigidly fixed in the housing 11. In the interior of the cylinder 8 there is an inner cylinder 9 containing a sphere 4, a bottom bracket 10 and a board 3 with an optical sensor 15. The inner cylinder 9 is in sliding contact with the outer cylinder 8, wherein the guide grooves 25 and the guide protrusions 32 protect the inner cylinder 9 from turning.

The bottom side of the inner cylinder 9 has a partition 31 on which a threaded sleeve 6 is installed. Such sleeve has a threaded connection with the screw 16 of the stepper motor 5. When moving the handle 1, the optical sensor 15 located on the board 3 receives information from the surface of the sphere 4 and transmits such information to the board 3 where the computing unit is located. The computing unit, in accordance with the software algorithm, determines the angle, speed and direction of rotation of the sphere 4 relative to the optical sensor 15.

The computing unit, based on the received data and the software, sends signals to the stepper motor 5. By rotating the screw 16 the stepper motor 5 moves the internal cylinder 9 up or down along with the structural elements located in it with the middle bracket 36 fixed on it using strips 37. Thus, introducing amendments to the changing gap 14 between the handle 1 and the sphere segment 12.

It should be noted that when moving the handle 1, with the compensating mechanism not working, the gap 14 will change. This is because the center of the sphere 4 and the focus of the sphere segment 34 do not coincide. Below the sphere 4 there are solenoids 7 and solenoid cores 21, which serve to simulate sidestick feedback with the control surfaces of the aircraft, to which the aircraft's computing device (not shown) supplies an electrical voltage that it changes depending on the software and flight conditions.

That is, the compensating mechanism, due to the rigid fixation to the inner cylinder 9, also carries almost the entire mechanism for simulating feedback, including solenoids 7, bars 37, middle bracket 36. The solenoid cores 21 are connected to sphere 4 by means of the bottom bracket 10, having a ball joint therebetween.

The solenoid cores are installed in solenoids 7, which also have a ball joint with the middle bracket 36. For the operation of solenoids 7, in the inner cylinder 9 there are provided windows for solenoids 22. Thus, board 3, optical sensor 15, sphere 4, solenoids 7, solenoid cores 21, the inner cylinder 9 and the middle bracket 36 attached represent elements of the movable compensating mechanism.

However, an embodiment of the design of the compensating mechanism is possible, wherein the strips 37 and the middle bracket 36 are absent, and the solenoids 7 have a ball joint with a static body 11. This embodiment is possible by using software capable of taking into account the operation of the solenoids without reference to the coordinate system of the compensating mechanism. In this arrangement when the compensating mechanism moves up or down, each of the solenoids 7 will work in its own coordinate system.

This principle can also be applied to adjust the gap 14 in an aircraft sidestick design where the center of the sphere 4 and the focus of the sphere segment 34 coincide (as in U.S. Pat. No. 2,730,081). In this option, before starting to use the sidestick, the user himself can adjust the gap 14. This might occur for example: by rotating the potentiometer, or before starting to use the sidestick, the user connects to it a flash card with information contained on it about the size of the user's hand, which was saved earlier during setup devices.

Information from the flash card is transferred to the computing unit, and after that the device itself, based on the received data and using a stepper motor compensating mechanism, sets the necessary parameters by moving the internal cylinder 9 up or down.

To reduce the height of the device, it is possible to use the mechanism shown in FIG. 4. Such mechanism is provided for moving the inner cylinder 9 for adjustment of the gap 14. This occurs by using stepper motors installed in the windows (not shown) of the outer cylinder 8 and gear racks 23, having a rigid connection with the inner cylinder 9, while utilizing stepper motors driving into rotation spur gears 28.

Referring now to FIG. 5 illustrating another embodiment of the method of the invention for moving the inner cylinder 9 up or down. This enables the invention to adjust the gap 14 using a threaded ring 30 having a screw connection with the inner cylinder 9 and threads (not shown) on the outside for engagement with the worm shaft 24 driven by the stepper motor 5.

When the worm shaft 24 rotates, by means of a screw connection the threaded ring 30 is driven. Such ring 30 using a screw connection with the inner cylinder 9, moves it up or down, depending on the rotational direction the of the worm shaft 24.

Referring now to FIG. 6 which illustrates a mechanism for moving the inner cylinder 9 to adjust the gap 14; wherein the stepper motor 5 through a small gear 29 rotates a large gear 26 installed below the cylinder 9. The large gear 26 is connected to the cylinder 9 using a threaded bushing 6 and a gear screw 27.

In this embodiment of the mechanism of the invention (as well as the embodiments shown in FIG. 5 and FIG. 6), the design of the aircraft sidestick may include several stepper motors. Also in this embodiment, instead of the large gear 29, a bevel gear (not shown in the figures) can be used, kinematically connected at an angle to another bevel gear driven from a stepper motor.

In addition, in the drive of the compensating mechanism, to regulate the gap 14, instead of gears, toothed belts and toothed pulleys (not shown in the figures) can be utilized.

Thus, there are several ways to adjust the gap 14 when the center of the sphere 4 and the focus of the segment of the sphere 34 of the device do not coincide.

Although the drawings illustrate the aircraft sidestick with the front location of the main bracket 2, however it should be noted that the positioning of the main bracket on the right or left side of the device handle is also in the scope of the invention.

The invention claimed is:

1. An aviation sidestick with active gap compensation, comprising:
- a housing;
- a handle configured to be moved by a user;
- a main bracket connected to the handle;
- a sphere connected to the main bracket;
- a sphere segment fixed relative to the housing and positioned relative to the handle, wherein a gap is provided between the handle and the sphere segment;
- an outer cylinder rigidly fixed relative to the housing;
- an inner cylinder disposed inside the outer cylinder and movable up and down relative to the outer cylinder, the inner cylinder containing the sphere;
- a board disposed in the inner cylinder;
- an optical sensor disposed on the board and configured to receive information from a surface of the sphere during movement of the handle;
- a computing unit configured to receive information from the optical sensor and, according to a software algorithm, determine an angle, a speed, and a direction of rotation of the sphere relative to the optical sensor; and
- a compensating mechanism configured to adjust the gap between the handle and the sphere segment, the compensating mechanism comprising a stepper motor and a drive mechanism operatively connected to the inner cylinder;
- wherein a center of the sphere and a center of an imaginary sphere defining the sphere segment are located on a common imaginary axis and do not coincide;
- wherein a radius of the sphere and a radius of the imaginary sphere defining the sphere segment are different;
- wherein, because the center of the sphere and the center of the imaginary sphere defining the sphere segment do not coincide, movement of the handle would change the gap between the handle and the sphere segment in the absence of operation of the compensating mechanism;
- wherein the computing unit is configured, during movement of the handle, to determine a compensation displacement based on the angle, speed, and direction of rotation of the sphere and to send signals to the stepper motor;
- wherein, in response to the signals from the computing unit, the stepper motor drives the drive mechanism to move the inner cylinder up or down relative to the outer cylinder together with the sphere, the board, and the optical sensor contained in the inner cylinder; and
- wherein movement of the inner cylinder up or down relative to the outer cylinder actively compensates for the changing gap between the handle and the sphere segment so that the gap remains substantially unchanged at different positions of the handle over the sphere segment.

2. The aviation sidestick of claim 1, wherein the drive mechanism comprises at least one transmission selected from the group consisting of: a screw and threaded bushing; a gear rack and spur gear; a worm shaft and threaded ring; a small gear and large gear; bevel gears; and toothed belts and toothed pulleys.

3. The aviation sidestick of claim 1, wherein the radius of the imaginary sphere defining the sphere segment is greater than the radius of the sphere so that the sphere segment provides a relatively even hand-supporting surface for a palm edge of the user.

4. The aviation sidestick of claim 1, wherein the drive mechanism comprises a screw and a threaded bushing, wherein the inner cylinder includes a partition, and wherein the threaded bushing is mounted on the partition and has threaded engagement with the screw driven by the stepper motor.

5. The aviation sidestick of claim 1, wherein the computing unit is configured to calculate the compensation displacement as a vertical displacement of the inner cylinder based on a stored geometric relationship between the sphere and the sphere segment.

6. The aviation sidestick of claim 1, further comprising a middle bracket rigidly connected to the inner cylinder by a plurality of bars or strips.

7. The aviation sidestick of claim 6, further comprising a bottom bracket fixed to the sphere and a force-feedback mechanism, wherein the force-feedback mechanism includes at least one solenoid having a solenoid core connected to the bottom bracket by a ball joint and a solenoid body connected to the middle bracket by a ball joint.

8. The aviation sidestick of claim 7, wherein the inner cylinder includes at least one window configured to receive or accommodate the at least one solenoid during movement of the inner cylinder.

9. The aviation sidestick of claim 7, wherein the computing unit is configured to supply control signals to the at least one solenoid to simulate force feedback corresponding to control surfaces of an aircraft.

10. The aviation sidestick of claim 1, wherein the sphere segment and the housing define a bracket mobility sector in the form of a cutout through which the main bracket moves during operational movement of the handle.

11. The aviation sidestick of claim 10, wherein at least one of the opposite sockets or bells of the corrugated electrical coupling structure includes a continuous circumferential electrical connector.

12. The aviation sidestick of claim 1, wherein the computing unit is configured to set an initial height of the handle relative to the sphere segment before operation by actuating the stepper motor to move the inner cylinder to a selected starting position.

13. The aviation sidestick of claim 12, wherein the selected starting position is determined based on user-specific hand-size information stored in memory or supplied to the computing unit by a removable memory device.

14. The aviation sidestick of claim 1, wherein the main bracket is formed from an upper part connected to the handle and a lower part connected to the sphere.

15. An aviation sidestick with active gap compensation, comprising:

a housing;

a handle including programmable keys and a scroll wheel;

a stationary spherical segment fixed relative to the housing and arranged adjacent to the handle, the stationary spherical segment being made of a slippery material and being spaced from the handle by a gap;

a main bracket having an upper portion connected to the handle and a lower portion;

a tracking sphere connected to the lower portion of the main bracket;

a board carrying an optical sensor positioned to detect movement of the tracking sphere, the board including a computing unit configured to receive movement data from the optical sensor;

wherein the tracking sphere and the stationary spherical segment have different radii, and wherein a center of the tracking sphere and a focus, or center of curvature, of the stationary spherical segment are located on a common imaginary axis and are offset from one another;

an active compensating mechanism located inside the housing, the active compensating mechanism comprising:

an outer cylinder fixed relative to the housing;

an inner cylinder movable relative to the outer cylinder along the common imaginary axis;

a stepper motor;

a screw driven by the stepper motor; and a threaded bushing engaged with the screw and operatively coupled to the inner cylinder;

wherein the tracking sphere, the board, and the optical sensor are carried by the inner cylinder so as to move together with the inner cylinder;

a middle bracket rigidly connected to the inner cylinder;

a force-feedback mechanism mounted to the middle bracket and including at least one solenoid disposed below the tracking sphere, wherein the force-feedback mechanism is mounted to the middle bracket such that the force-feedback mechanism moves together with the inner cylinder, the tracking sphere, the board, and the optical sensor; and a corrugated electrical coupling structure electrically coupling the handle to the board, the corrugated electrical coupling structure having opposite sockets or bells carrying respective electrical connectors, the respective electrical connectors being interconnected by electrical wires embedded in a material body of the corrugated electrical coupling structure;

wherein, during operational movement of the handle relative to the stationary spherical segment, the optical sensor detects movement of the tracking sphere and transmits movement data to the computing unit, and the computing unit, based on the movement data, actuates the stepper motor to rotate the screw and translate the inner cylinder upward or downward relative to the outer cylinder, thereby moving the tracking sphere, the board, the optical sensor, the middle bracket, and the force-feedback mechanism as a movable unit to compensate for changes in the gap and maintain the gap between the handle and the stationary spherical segment substantially unchanged during movement of the handle.

16. A sidestick controller with active gap compensation, comprising:

a housing;

a handle manually movable relative to the housing;

a spherical member operatively coupled to the handle so that movement of the handle causes rotation of the spherical member;

a spherical segment fixed relative to the housing and having a curved surface facing the handle, an operating gap being defined between the handle and the spherical segment;

a movable carrier guided for translation relative to the housing along a compensation axis, the movable carrier supporting the spherical member and a sensor arranged to sense movement of a surface of the spherical member;

an actuator operatively coupled to the movable carrier; and a controller in communication with the sensor and the actuator;

wherein the spherical member has a first center and a first radius, and the spherical segment is defined by an imaginary sphere having a second center of curvature and a second radius;

wherein the first center and the second center of curvature are spaced from one another along the compensation axis, and the first radius and the second radius are different, so that manual movement of the handle would produce a change in the operating gap in the absence of translation of the movable carrier;

wherein the controller is configured to determine, from output of the sensor, a rotational state of the spherical member caused by movement of the handle;

wherein the controller is further configured to determine, from the rotational state and a stored compensation relationship corresponding to the spaced first and second centers and the different first and second radii, a compensation displacement for the movable carrier; and wherein, during manual movement of the handle, the controller commands the actuator to translate the movable carrier along the compensation axis by the compensation displacement, thereby moving the spherical member and the sensor together relative to the fixed spherical segment to compensate for the change in the operating gap and maintain the operating gap substantially constant at different positions of the handle.

* * * * *